(12) United States Patent
Kim

(10) Patent No.: US 9,012,009 B2
(45) Date of Patent: Apr. 21, 2015

(54) EPOXY RESIN ADHESIVE COMPOSITION AND PERFORATED FLOOR PANEL FOR CLEAN ROOM COMPRISING THE SAME

(71) Applicant: Hae Kwang Co., Ltd., Jin Cheon-gun (KR)

(72) Inventor: Myun Soo Kim, Gwacheon (KR)

(73) Assignee: Hae Kwang Co., Ltd., Jincheon-Gun (KR)

( * ) Notice: Subject to any disclaimer, the term of this patent is extended or adjusted under 35 U.S.C. 154(b) by 0 days.

(21) Appl. No.: 13/688,318

(22) Filed: Nov. 29, 2012

(65) Prior Publication Data

US 2013/0302559 A1    Nov. 14, 2013

(30) Foreign Application Priority Data

May 10, 2012 (KR) .................. 10-2012-0049419

(51) Int. Cl.
  *C09J 163/10* (2006.01)
  *C09J 163/00* (2006.01)
  *E04F 15/02* (2006.01)
  *E04F 15/10* (2006.01)

(52) U.S. Cl.
  CPC .............. *C09J 163/10* (2013.01); *C09J 163/00* (2013.01); *E04F 15/02155* (2013.01); *E04F 15/105* (2013.01); *E04F 15/107* (2013.01)

(58) Field of Classification Search
  CPC .......................... C08L 63/00; C09J 163/00
  USPC ............... 52/630; 156/60; 106/162.1, 14.42; 523/400, 427, 428, 454, 456; 428/413, 428/137
  See application file for complete search history.

(56) References Cited

U.S. PATENT DOCUMENTS

| 5,929,141 | A | * | 7/1999 | Lau et al. | 523/458 |
| 6,155,013 | A | * | 12/2000 | Kim | 52/263 |
| 6,884,854 | B2 | * | 4/2005 | Schoenfeld et al. | 525/524 |
| 2002/0164485 | A1 | * | 11/2002 | Martin | 428/413 |
| 2006/0205897 | A1 | * | 9/2006 | Frick et al. | 525/524 |

(Continued)

FOREIGN PATENT DOCUMENTS

| EP | 0370463 | 5/1990 |
| EP | 0370531 | 5/1990 |

(Continued)

OTHER PUBLICATIONS

BYK-W 940_961, Mar. 2011, BYK Additives & Instruments, Mar. 2011, Data Sheet ASW4.*
Search Report related to the above-listed US, EP, and JP patent applications, Feb. 24, 2014.
Search Report related to TW201038658, Apr. 21, 2014.

*Primary Examiner* — Aaron Austin
*Assistant Examiner* — Jasper Saberi
(74) *Attorney, Agent, or Firm* — Antonio Ha & U.S. Patent, LLC

(57) ABSTRACT

The present invention provides an epoxy resin adhesive composition and a perforated floor panel for a clean room including the same. The epoxy resin adhesive composition is a two-component epoxy resin adhesive composition comprising a main material including graphite having conductivity and a curing agent including a amide compound, wherein the main material and the curing agent are mixed at a weight ratio of 2:1. When this epoxy resin adhesive composition is disposed between a base panel and a resin tile constituting the perforated floor panel for a clean room, the adhesion between the base panel and the resin tile becomes high, heat is easily discharged to the outside by graphite, and the generation of static electricity can be reduced.

17 Claims, 1 Drawing Sheet

(56) References Cited

U.S. PATENT DOCUMENTS

2009/0048370 A1    2/2009   Lutz et al.
2011/0263754 A1*  10/2011   Wilson et al. ................. 523/459
2012/0156382 A1    6/2012   Eichelmann

FOREIGN PATENT DOCUMENTS

| EP | 0982385    | 5/1998  |
| JP | 2007-107018 | 4/2007  |
| TW | 201038658  | 11/2010 |

* cited by examiner

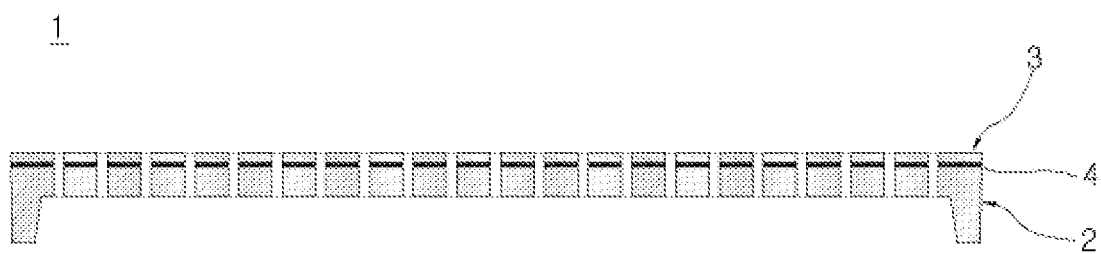

EPOXY RESIN ADHESIVE COMPOSITION AND PERFORATED FLOOR PANEL FOR CLEAN ROOM COMPRISING THE SAME

BACKGROUND OF THE INVENTION

1. Technical Field

The present invention relates to an epoxy resin adhesive composition and a perforated floor panel for a clean room comprising the same, and, more particularly, to an epoxy resin adhesive composition which provides high adhesivity between a base material and a counter material, for example, a base panel and a resin tile, which can easily emit heat because it provides thermal conductivity and which can reduce the generation of static electricity, and a perforated floor panel for a clean room comprising the same.

2. Description of the Related Art

Generally, an epoxy resin is widely used to prepare an epoxy adhesive composition for adhering a base material and a counter material because it has excellent water resistance, adhesivity and chemical resistance. An epoxy resin adhesive composition may include a curing agent for improving curability, and additives, such as a diluent and the like, for lowering viscosity and improving workability in addition to an epoxy resin.

However, the above-mentioned epoxy resin adhesive composition is problematic in that it cannot sufficiently meet the requirement of customers, and in that, with the passage of time, its weather resistance deteriorates, thus causing a yellowing phenomenon.

Further, a conventional epoxy resin adhesive composition is problematic in that its adhesivity and chemical resistance deteriorate early because its components and composition ratio thereof are not optimized. Further, a conventional epoxy resin adhesive composition is problematic in that, with the passage of time, the epoxy resin adhesive composition gradually reacts with carbon dioxide, moisture or the like in the air, so the outer surface thereof facing the air is fatally damaged, and a brush phenomenon in which an epoxy resin becomes white occurs.

SUMMARY OF THE INVENTION

Accordingly, the present invention has been devised to solve the above-mentioned problems, and an object of the present invention is to provide an epoxy resin adhesive composition which provides high adhesivity between a base material and a counter material, for example, a base panel and a resin tile, which can easily emit heat and which is can reduce the generation of static electricity, and a perforated floor panel for a clean room comprising the same.

Another object of the present invention is to provide an epoxy resin adhesive composition which can prevent the deterioration of adhesivity even in long-term use, which can prevent the discoloration of the outer surface thereof facing the air, which can improve chemical resistance and which does not produce environmental pollutants, and a perforated floor panel for a dean room comprising the same.

In order to accomplish the above object, a first aspect of the present invention provides an epoxy resin adhesive composition, which is a two-component epoxy resin adhesive composition, including: a main material; and a curing agent, wherein the main material includes 18~25.7 wt % of a basic epoxy resin, 15~22.4 wt % of a modified epoxy resin, 7.3~13 wt % of a polyester resin for providing adhesivity, 7~19.5 wt % of a methyl ethyl ketone (MEK) solvent for adjusting viscosity, 0.15~30.2 wt % of epoxy dam for increasing adhesivity, 6~15 wt % of graphite for providing conductivity, 8~30 wt % of a first filler for providing viscosity, 5~45 wt % of a second filler for providing thixotropy, and 0.01~10 wt % of a dispersant for dispersing the first and second fillers, the curing agent includes 14~30 wt % of a middle-viscosity amide compound, 10~35 wt % of a low-viscosity amide compound, 1.1~8.5 wt % of a catalyst for promoting curing, 0.5~15 wt % of a methyl ethyl ketone (MEK) solvent for adjusting viscosity, 0.01~8 wt % of aminosilane for increasing adhesivity, 10~60 wt % of a first filler for providing viscosity, and 3~17 wt % of a second filler for providing thixotropy, and the main material and the curing agent are mixed at a weight ratio of 2:1.

In the main material, the dispersant may include alkyl ammonium and the first filler is may include calcium carbonate ($CaCO_3$), and in the curing agent, the catalyst may include peroxide or triphenyl bismuth and the first filler may include calcium carbonate ($CaCO_3$).

A second aspect of the present invention provides a perforated floor panel for a clean room, including: a base panel made of a metal and having a plurality of vent holes obliquely formed between upper and lower surfaces thereof; a resin tile disposed on one side of the base panel and having a plurality of vent holes corresponding to the vent holes; and the epoxy resin adhesive composition disposed between the base panel and the resin the to integrate the base panel with the resin tile.

BRIEF DESCRIPTION OF THE DRAWINGS

FIG. 1 is a schematic sectional view showing a perforated floor panel for a clean room according to a second embodiment of the present invention.

REFERENCE NUMERALS

1: Perforated floor panel
2: Base panel
3: Resin tile
4: Epoxy resin adhesive composition

DESCRIPTION OF THE PREFERRED EMBODIMENTS

Hereinafter, an epoxy resin adhesive composition according to a first embodiment of the present invention and a perforated floor panel for a clean room comprising the epoxy resin adhesive composition according to a second embodiment of the present invention will be described with reference to FIG. 1.

The epoxy resin adhesive composition according to a first embodiment of the present invention, which is a two-component epoxy resin adhesive composition, includes: a main material; and a curing agent, wherein the main material includes 18~25.7 wt % of a basic epoxy resin, 15~22.4 wt % of a modified epoxy resin, 7.3~13 wt % of a polyester resin for providing adhesivity, 7~19.5 wt % of a methyl ethyl ketone (MEK) solvent for adjusting viscosity, 0.15~30.2 wt % of epoxy silane for increasing adhesivity, 6~15 wt % of graphite for providing conductivity, 8~30 wt % of a first filler for providing viscosity, 5~45 wt % of a second filler for providing thixotropy, and 0.01~10 wt % of a dispersant for dispersing the first and second fillers, the curing agent includes 14~30 wt % of a middle-viscosity amide compound, 10~35 wt % of a low-viscosity amide compound, 1.1~8.5 wt % of a catalyst for promoting curing, 0.5~15 wt % of a methyl ethyl ketone (MEK) solvent for adjusting viscosity, 0.01~8 wt % of aminosilane for increasing adhesivity, 10~60 wt % of a first filler for providing viscosity, and 3~17 wt % of a second filler for providing thixotropy, and the main material and the curing agent are mixed at a weight ratio of 2:1.

In the main material, the dispersant may include alkyl ammonium and the first filler may include calcium carbonate ($CaCO_3$), and in the curing agent, the catalyst may include to peroxide or triphenyl bismuth and the first filler may include caldum carbonate ($CaCO_3$).

Hereinafter, the above-mentioned epoxy resin adhesive composition will be described in more detail as follows.

In the main material, the basic epoxy resin (18~25.7 wt %) is a liquid resin, and reacts with a curing agent to increase adhesivity. The modified epoxy resin (15~22.4 wt %) is a high-viscosity resin, and serves to provide adhesivity. The polyester resin (7.3~13 wt %) is an adhesive solid resin, and provides high adhesivity when it is diluted with a solvent. The methyl ethyl ketone (MEK) solvent (7~19.5 wt %) is a solvent having a ketone group, and functions to adjust viscosity. The epoxy silane (0.15~30.2 wt %), which is a silane having an epoxy group, improves adhesivity, and has reactivity with a curing agent. The graphite (6~15 wt %), which is composed of carbon particles, may have an average particle size of about 1.5 μm in order to increase the mixability with other components, and serves to provide conductivity. The first filler (8~30 wt %) may have an average particle size of about 3 μm in order to increase the mixability with other components, and serves to provide viscosity. The second filler (5~45 wt %) is extracted from day, and provides thixotropy. The dispersant (0.01~10 wt %) serves to disperse the first and second fillers. The amounts of the components included in the main material may be controlled such that the components are optimally mixed with each other, adhesivity is improved, and the deterioration of adhesivity is prevented even when the epoxy resin adhesive composition is used for a long period of time.

In the curing agent, the middle-viscosity amide compound (14~30 wt %) serves to improve adhesivity, and the low-viscosity amide compound (10~35 wt %) serves to adjust a curing speed. The catalyst (1.1~8.5 wt %) is a cure promoter, and influences curing in speed. The methyl ethyl ketone (MEK) solvent (0.5~15 wt %) is a solvent having a ketone group, and serves to adjust viscosity. The aminosilane (0.01~8 wt %) serves to increase adhesivity. The first filler (10~60 wt %) may have an average particle size of about 3 μm in order to increase the mixability with other components, and serves to provide viscosity. The second filler (3~17 wt %) serves to provide thixotropy.

Further, the main material and the curing agent may be mixed at a weight ratio of 2:1 such that they are appropriately mixed with each other, adhesivity increases, and a curing speed is suitably controlled. When the mixing ratio thereof is not 2:1, at least one of mixing effect, adhesivity and curing speed cannot be satisfied at the desired level.

Specifically, in the main material, the dispersant may include alkyl ammonium, and the first filler may include calcium carbonate ($CaCO_3$). Further, in the curing agent, the catalyst may include a peroxide or triphenyl bismuth, and the first filler may include calcium carbonate ($CaCO_3$).

The components, structural formulae (or functions), composition ratios (wt %) and characteristics of the main material of the epoxy resin adhesive composition are given in Table 1 below, and the components, structural formulae (or functions), composition ratios (wt %) and characteristics of the curing agent of the epoxy resin adhesive composition are given in Table 2 below.

TABLE 1

| | | Epoxy resin adhesive composition - main material | | |
|---|---|---|---|---|
| Main material | Component (raw material) | Structural formula (or function) | Composition ratio (wt %) | Characteristics |
| | Basic epoxy resin | CH2OCHCH2— (OC6H4C(CH3) 2C6H4OCH2CH(OH) CH2)m-OC6H4C(CH3) 2C6H4OCH2CHOCH2 | 18~25.7 | It is a liquid resin, it reacts with a curing agent to increase adhesivity and hardness, it contains a reactive diluent, it deteriorates the viscosity of a product in winter, and it is easily used. |
| | Modified epoxy resin | Rubber modified epoxy | 15~22.4 | It is a high-viscosity liquid resin, and it provides adhesivity. |
| | Polyester resin | Tackiness improver | 7.3~13 | It is an adhesive solid resin, and it provides strong adhesivity when diluted in a solvent. |
| | MEK solvent | CH3COC2H5 | 7~19.5 | It is a solvent having a ketone group, and it is used to adjust viscosity. |
| | Epoxy silane | CH2OCH—(Si2)n-CHOCH2 | 0.15~30.2 | It is a silane having an epoxy group, it is used to improve adhesivity, and it has reactivity to a curing agent. |
| | Graphite | C | 6~15 | It is composed of carbon particles, it has an average particle size of 1.5 micron, and it is used to provide conductivity. |
| | First filler | CaCo3 | 8~30 | It includes spherical $CaCo_3$ particles having an average particle size of 3 micron, and it reduces production cost and provides viscous characteristics. |

TABLE 1-continued

Epoxy resin adhesive composition - main material

| Main material | Component (raw material) | Structural formula (or function) | Composition ratio (wt %) | Characteristics |
|---|---|---|---|---|
| | Second filler | Thixotropy improver | 5~45 | It is extracted from clay, it is provides strong thixotropy when added to a raw material, and it serves to prevent precipitation. |
| | Dispersant | Alkyl ammonium | 0.01~10 | It helps a filler to be dispersed, and it serves to prevent precipitation and to decrease viscosity somewhat. |

TABLE 2

Epoxy resin adhesive composition - curing agent

| Curing agent | Component (raw material) | Structural formula (or function) | Composition ratio (wt %) | Characteristics |
|---|---|---|---|---|
| | Middle-viscosity amide compound | —(NH—(CH2)5—CO)n-CH=CHCH2NH2 | 14~30 | It is an amide curing agent, it is solidified and crosslinked by the bonding of an amine group and an epoxy group at the end thereof, it has middle viscosity, and it serves to improve adhesivity. |
| | Low-viscosity amide compound | | 10~35 | It is an intermediate curing agent between amide and amine, it has low viscosity and low adhesivity, it is easily used to adjust viscosity, and it is used to control curing speed because it has very high reactivity. |
| | Catalyst | Peroxide or triphenyl bismuth | 1.1~8.5 | It influences curing speed. |
| | MEK solvent | CH3COC2H5 | 0.5~15 | It is a solvent having a ketone group, and it is used to adjust viscosity. |
| | Aminosilane | NH2CH2CH=CH—(SiH2)n-CH=CH—CH2NH2 | 0.01~8 | It is a silane having an epoxy group, and it is used to improve adhesivity. |
| | First filler | CaCo3 (filler having surface pores) | 10~60 | It includes spherical CaCo3 particles having an average particle size of 3 micron, and it reduces production cost and provides viscous characteristics. |
| | Second filler | Thixotropy improver (filler having no surface pores) | 3~17 | It is extracted from clay, it is provides strong thixotropy when added to a raw material, and it serves to prevent precipitation (powder form). |

The main materials of the epoxy resin adhesive compositions of Example 1 and Comparative Example 1 to 4 are given in Table 3 below, and the curing agents of the epoxy resin adhesive compositions of Example 1 and Comparative Example 1 to 4 are given in Table 3 below.

TABLE 3

Epoxy resin adhesive composition - main material
Main material

| Component (raw material) | Structural formula (or function) | Ex. 1 (wt %) | Comp. Ex. 1 (wt %) | Comp. Ex. 2 (wt %) | Comp. Ex. 3 (wt %) | Comp. Ex. 4 (wt %) |
|---|---|---|---|---|---|---|
| Basic epoxy resin | CH2OCHCH2—(OC6H4C(CH3)2C6H4OCH2CH(OH)CH2)m-OC6H4C(CH3)2C6H4OCH2CHOCH2 | 18~25.7 | 20 | 16.3 | 23 | 15.3 |
| Modified epoxy resin | Rubber modified epoxy | 15~22.4 | 19 | 14 | 22 | 14 |
| Polyester resin | Tackiness improver | 7.3~13 | 17.3 | 9 | 0 | 2 |
| MEK solvent | CH3COC2H5 | 7~19.5 | 20 | 27 | 20.3 | 34 |
| Epoxy silane | CH2OCH—(Si2)n-CHOCH2 | 0.15~30.2 | 0.5 | 0.5 | 0.5 | 0.5 |
| Graphite | C | 6~15 | 0 | 11 | 11 | 11 |
| First filler | CaCo3 | 8~30 | 13 | 12 | 13 | 13 |
| Second filler | Thixotropy improver | 5~45 | 10 | 10 | 10 | 10 |
| Dispersant | Alkyl ammonium | 0.01~10 | 0.2 | 0.2 | 0.2 | 0.2 |
| | Total | 100 | 100 | 100 | 100 | 100 |

TABLE 4

Epoxy resin adhesive composition - curing agent
Curing agent

| Component (raw material) | Structural formula (or function) | Ex. 1 (wt %) | Comp. Ex. 1 (wt %) | Comp. Ex. 2 (wt %) | Comp. Ex. 3 (wt %) | Comp. Ex. 4 (wt %) |
|---|---|---|---|---|---|---|
| Middle-viscosity amide compound | —(NH—(CH2)5—CO)n-CH=CHCH2NH2 | 14~30 | 20 | 22 | 20 | 18 |
| Low-viscosity amide compound | | 10~35 | 20 | 22 | 20 | 18 |
| Catalyst | Peroxide or triphenyl bismuth | 1.1~8.5 | 4 | 0 | 4 | 6 |
| MEK solvent | CH3COC2H5 | 0.5~15 | 1.4 | 1.4 | 1.4 | 3.4 |
| Aminosilane | NH2CH2CH=CH—(SiH2)n-CH=CH—CH2NH2 | 0.01~8 | 0.6 | 0.6 | 0.6 | 0.6 |
| First filler | CaCo3 | 10~60 | 40 | 40 | 40 | 40 |
| Second filler | Thixotropy improver | 3~17 | 14 | 14 | 14 | 14 |
| | Total | 100 | 100 | 100 | 100 | 100 |

The test results of physical properties of the epoxy resin adhesive composition obtained by mixing the main material of Example 1 given in Table 3 above with the curing agent of Example 1 given in Table 4 and the test results of physical properties of each of the epoxy resin adhesive compositions obtained by mixing the main materials of Comparative Examples 1 to 4 given in Table 3 above with the curing agents of Comparative Examples 1 to 4 given in Table 4 are given in Table 5 below. It can be ascertained from Table 5 that the epoxy resin adhesive composition of Example 1 exhibits excellent physical properties when it has the above-mentioned components and it) composition ratio.

TABLE 5

Test results

| | Ex. 1 | Comp. Ex. 1 | Comp. Ex. 2 | Comp. Ex. 3 | Comp. Ex. 4 | Remarks |
|---|---|---|---|---|---|---|
| Mixing ratio | 2:1 | 2:1 | 2:1 | 2:1 | 2:1 | |
| Phenomenon | normal curing speed normal adhesivity normal initial tackiness | normal curing speed normal adhesivity insufficient initial tackiness | slowly cured speed insufficient adhesivity insufficient initial tackiness | normal curing speed normal adhesivity initial tackiness none | slowly cured nonadhesive thixotropy none | |
| Conductivity ($\Omega$) | $10^{5-6}$ | not measured | $10^{9-10}$ | $10^{5-6}$ | $10^{6-7}$ | PRS-801 was used (ASTM F 150) |

The test results of adhesivity of the epoxy resin adhesive compositions of Example 1 and Comparative Examples 1 to 4 are given in Table 6 below. It can be ascertained from Table 6 that the epoxy resin adhesive composition of Example 1 exhibits high adhesivity when it has the above-mentioned components and composition ratio.

TABLE 6

|  | Adhesivity | Remarks |
| --- | --- | --- |
| Example 1 | 71.3 kg/cm²O | F108-2B was used (ASTM 4541) |
| Comp. Example 1 | 50.8 kg/cm² | " |
| Comp. Example 2 | 33.6 kg/cm² | " |
| Comp. Example 3 | 47.7 kg/cm² | " |
| Comp. Example 4 | 25.8 kg/cm² | " |

Meanwhile, FIG. 1 is a schematic sectional view showing a perforated floor panel for a clean room according to a second embodiment of the present invention.

As shown in FIG. 1, the perforated floor panel 1 for a clean room according to the second embodiment of the present invention includes: a base panel 2 made of a metal and having a plurality of vent holes obliquely formed between upper and lower surfaces thereof; a resin tile 3 disposed on one side of the base panel 2 and having a plurality of vent holes corresponding to the vent holes; and the epoxy resin adhesive composition 4 according to the first embodiment of the present invention disposed between the base panel 2 and the resin tile 3 to integrate the base panel 2 with the resin tile 3.

The vent holes of the base panel 2 may be previously formed by casting or may be formed by punching after casting, and the vent holes of the resin tile 3 may be formed by punching after attaching the resin tile 3 to the base panel 2. In the base panel 2 and the resin tile 3, the term "obliquely" means a direction perpendicular to the base panel 2 or the resin tile 3 and a direction inclined to the base panel 2 or the resin tile 3. When the epoxy resin adhesive composition 4 is applied to the upper surface of the base panel 2 and then the resin tile 3 is aligned and attached to the applied epoxy resin adhesive composition 4, this epoxy resin adhesive composition 4 is cured with the passage of time, thus strongly attaching the resin tile 2 to the base panel 2.

As described above, the epoxy resin adhesive composition according to the first embodiment of the present invention has components and composition ratios thereof that are different from those of a conventional adhesive composition. Therefore, when this epoxy resin adhesive composition is disposed between the base panel and resin tile constituting the perforated floor panel for a clean room, the adhesion between the base panel and the resin becomes high, heat is easily discharged to the outside by graphite or the like having conductivity, and the generation of static electricity can be reduced.

Further, since the perforated floor panel for a clean room according to the second embodiment of the present invention includes the epoxy resin adhesive composition according to the first embodiment of the present invention applied between the base panel and the resin tile, the deterioration of adhesivity can be prevented even when it is used for a long period of time, the discoloration of the outer surface thereof facing the air can be prevented, and environmental pollutants are not produced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An epoxy resin adhesive composition, which is a two-component epoxy resin adhesive composition, comprising:
a main material; and a curing agent,
wherein the main material comprises 1~25.7 wt % of a basic epoxy resin based on the total weight of the main material, 0.15~22.4 wt % of a modified epoxy resin, 7.3~13 wt % of a polyester resin for providing adhesivity, 7~19.5 wt % of a methyl ethyl ketone (MEK) solvent for adjusting viscosity, 0.15~30.2 wt % of epoxy silane for increasing adhesivity, 6~15 wt % of graphite for providing conductivity, 8~30 wt % of a first filler for providing viscosity, 5~45 wt % of a second filler for providing thixotropy, and 0.01~10 wt % of a dispersant for dispersing the first and second fillers,
the curing agent comprises 14~30 wt % of a middle-viscosity amide compound based on the total weight of the curing agent, 10~35 wt % of a low-viscosity amide compound, 1.1~8.5 wt % of a catalyst for promoting curing, 0.5~15 wt % of a methyl ethyl ketone (MEK) solvent for adjusting viscosity, 001~8 wt % of aminosilane for increasing adhesivity, 10~60 wt % of a first filler for providing viscosity, and 3~17 wt % of a second filler for providing thixotropy, and the main material and the curing agent are mixed at a weight ratio of 2:1.

2. The epoxy resin adhesive composition of claim 1, wherein, in the main material, the dispersant includes alkyl ammonium and the first filler includes calcium carbonate ($CaCO_3$), and in the curing agent, the catalyst includes peroxide or triphenyl bismuth and the first filler includes calcium carbonate ($CaCO_3$).

3. A perforated floor panel for a clean room, comprising:
a base panel made of as metal and having as plurality of vent holes obliquely formed between upper and lower surfaces thereof;
a resin tile disposed on one side of the base panel and having a plurality of vent holes corresponding to the vent holes of the base panel; and
an epoxy resin adhesive composition disposed between the base panel and the resin tile to integrate the base panel with the resin tile
wherein the epoxy resin adhesive composition, which is a two-component epoxy resin adhesive composition, comprising: a main material; and a curing agent,
wherein the main material comprises 18~25.7 wt % of a basic epoxy resin, 15~22.4 wt % of a modified epoxy resin, 7.3~13 wt % of a polyester resin for providing adhesivity, 7~19.5 wt % of a methyl ethyl ketone (MEK) solvent for adjusting viscosity, 0.15~30.2 wt % of epoxy silane for increasing adhesivity, 6~15 wt % of graphite for providing conductivity, 8~30 wt % of a first filler for providing viscosity, 5~45 wt % of a second filler for providing thixotropy, and 0.01~10 wt % of a dispersant for dispersing the first and second fillers, the curing agent comprises 14~30 wt % of a middle-viscosity amide compound, 10~35 wt % of a low-viscosity amide compound, 1.1~8.5 wt % of a catalyst for promoting curing, 0.5~15 wt % of a methyl ethyl ketone (MEK) solvent for adjusting viscosity, 0.01~8 wt % of aminosilane for increasing adhesivity, 10~60 wt % of a first filler for providing viscosity, and 3~17 wt % of a second filler for providing thixotropy, and the main material and the curing agent are mixed at a weight ratio of 2:1.

4. The perforated floor panel for a clean room according to claim 3, wherein, in the main material, the dispersant includes alkyl ammonium and the first filler includes calcium carbonate (CaCO3), and in the curing agent, the catalyst includes peroxide or triphenyl bismuth and the first filler includes calcium carbonate (CaCO3).

5. The epoxy resin adhesive composition of claim 1, wherein the graphite includes carbon particles each having an average particle size of about 1.5 μm.

6. The epoxy resin adhesive composition of claim 1, wherein the first filler has an average particle size of about 3 μm.

7. The epoxy resin adhesive composition of claim 1, wherein the second filler is extracted from clay.

8. The epoxy resin adhesive composition of claim 1, wherein the dispersant includes alkyl ammonium.

9. The epoxy resin adhesive composition of claim 1, wherein the catalyst eludes at peroxide or triphenyl bismuth.

10. The epoxy resin adhesive composition of claim 1, wherein the first filler has surface pores.

11. The epoxy resin adhesive composition of claim 10, wherein the second tiller has no surface pores.

12. The epoxy resin adhesive composition of claim 1, wherein the basic epoxy resin has a structural formula as follows:

CH2OCHCH2-(OCH6CH4C(CH3)2C6H 4OCH2CH(OH)CH2)*m*-OC6H3C(CH3)2C6H4OCH2CHOCH2.

13. The epoxy resin adhesive composition of claim 1, wherein the modified epoxy resin includes a rubber modified epoxy.

14. The epoxy resin adhesive composition of claim 1, wherein the MEK solvent has a structural formula as follows:

CH3COC2H5.

15. The epoxy resin adhesive composition of claim 1, wherein the epoxy silane has a structural formula as follows:

CH2OCH—(Si2)*n*-CHOCH2.

16. The epoxy resin adhesive composition of claim 1, wherein the middle-viscosity amide compound has a structural formula as follows:

—(NH—(CH25-CO)*n*-CH=CHCH2NH2.

17. The epoxy resin adhesive composition of claim 1, wherein the aminosilane has a structural formula as follows:

NH2CH2CH=CH—(SiH2)*n*-CH=CH—CH2NH2.

* * * * *